(12) United States Patent
Hopkins

(10) Patent No.: US 7,083,089 B2
(45) Date of Patent: Aug. 1, 2006

(54) OFF-LINE PIN VERIFICATION USING IDENTITY-BASED SIGNATURES

(75) Inventor: W. Dale Hopkins, Georgetown, KY (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 198 days.

(21) Appl. No.: 10/761,752

(22) Filed: Jan. 20, 2004

(65) Prior Publication Data

US 2005/0156029 A1    Jul. 21, 2005

(51) Int. Cl.
*G06K 5/00* (2006.01)

(52) U.S. Cl. .............. 235/382; 235/379; 235/380; 235/492; 705/17

(58) Field of Classification Search ........... 235/382; 705/72; 713/184
See application file for complete search history.

(56) References Cited

U.S. PATENT DOCUMENTS

| | | | |
|---|---|---|---|
| 4,193,131 A | 3/1980 | Lennon et al. | |
| 4,223,403 A | 9/1980 | Konheim et al. | |
| 4,500,750 A | 2/1985 | Elander et al. | |
| 4,926,480 A * | 5/1990 | Chaum | 705/69 |
| 5,214,698 A | 5/1993 | Smith, Sr. et al. | |
| 6,460,138 B1 * | 10/2002 | Morris | 713/184 |
| 6,694,436 B1 * | 2/2004 | Audebert | 726/9 |
| 6,736,313 B1 * | 5/2004 | Dickson | 235/380 |
| 2001/0001155 A1 | 5/2001 | Smith, Sr. et al. | |
| 2003/0076960 A1 | 4/2003 | Chandersekaran et al. | |

OTHER PUBLICATIONS

Asokan et al. "The state of the art in electronic payment systems", Computer vol. 30, Issue 9, Sep. 1997 pp.: 28-35, Digital Object Identifier 10.1109/2.612244.*

* cited by examiner

*Primary Examiner*—Seung H Lee

(57) ABSTRACT

A method for off-line Personal Identification Number (PIN) verification using a smart card accessed on an off-line terminal comprises creating a unique secret key for an enrolled smart card using a card issuer private key, and generating signatures on an entered PIN using the unique key. The signatures are verifiable by the smart card and/or the terminal.

36 Claims, 10 Drawing Sheets

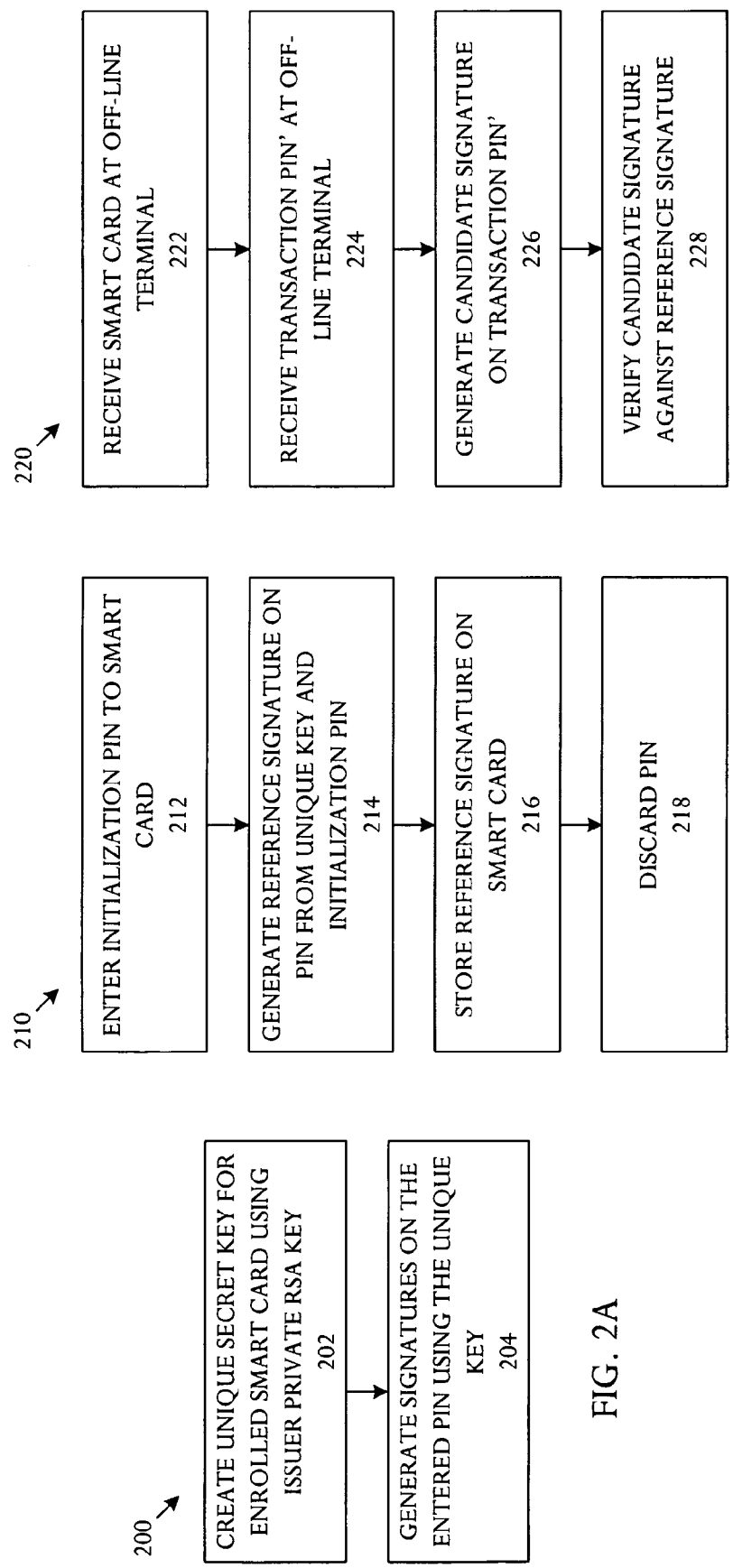

OFF-LINE PIN VERIFICATION USING IDENTITY-BASED SIGNATURES

BACKGROUND OF THE INVENTION

Each day in the United States alone over 100 million transactions aggregating $5 Billion are authorized and initiated by cardholders at over 400,000 Automated Teller Machines (ATMs) and seven million Point-of-Sale (POS) terminals. Securing the massive daily financial flow against fraud and loss relies upon protecting and verifying cardholder Personal Identification Numbers (PINs) using methods, structures, and cryptographic algorithms originating over twenty-five years ago.

Data security systems, such as financial systems, use security techniques and systems originating in the early 1980s that were based on technologies created in the late 1970s. Computational power, cryptanalytic knowledge, breadth of targets, and creative ingenuity accessible to potential attackers have grown dramatically since origination of the systems, while defensive technologies have scarcely evolved.

The Personal Identification Number (PIN) is a basic construct for establishing identity and authorization or consumer financial transactions. However, the current structure of the PIN block used in transmitting PIN data with a transaction is inefficient in the sense that further data security may be available.

Current PIN verification techniques are cryptographically weak, resulting in a data security vulnerability that even exceeds weaknesses in underlying keys and algorithms. These weaknesses can be attacked by an adversary, potentially resulting in a loss of data security.

Management of institutions and financial networks has expressed a desire for an off-line PIN verification capability that may be enabled by widespread usage of smart cards. For example, EuroPay, MasterCard, VISA (EMV Card Personalization Specification) smart card specifications provide off-line PIN verification by storing the clear PIN in the smart card. Verification is accomplished by comparing the entered PIN with the stored PIN, a simple technique that violates the basic security premise that the PIN is something that is known only to the customer, not written down, and particularly is not carried within the token that the customer presents to initiate the transaction.

A cryptographic algorithm with a secret key is difficult to use in an off-line environment because the terminal and the smart card, and perhaps all smart cards, may share a common key, creating security difficulties when security of either the terminal or the cards is breached.

SUMMARY

What is desired is a PIN verification technique that enables verification without storing the PIN in the card.

In accordance with various embodiments of a data security system, a method for off-line Personal Identification Number (PIN) verification using a smart card accessed on an off-line terminal comprises creating a unique secret key for an enrolled smart card using a card issuer private key, and generating signatures on an entered PIN using the unique key. The signatures are verifiable by the smart card and/or the terminal.

BRIEF DESCRIPTION OF THE DRAWINGS

Embodiments of the invention relating to both structure and method of operation may best be understood by referring to the following description and accompanying drawings.

FIGS. 2A, 2B, and 2C are flow charts showing an embodiment of a technique for off-line PIN verification using a smart card accessed on an off-line terminal.

DETAILED DESCRIPTION

An identity-based signature technique is used for off-line Personal Identification Number (PIN) verification using a smart card is based on an underlying RSA (Rivest, Shamir, and Adelman Public Key Cryptosystem) system. The private RSA key of a card issuer is used to create a unique secret key for each enrolled smart card. The unique key is used to generate signatures on a PIN that the smart card or a terminal may verify. The technique can eliminate key management problems associated with conventional off-line verification techniques.

A key stored in the card is unique to that card so that exposure of the key does not compromise other cards or systems. Similarly, if a key is stored in the terminal, exposure of the key cannot compromise security or integrity of any cards.

A unique key per smart card is derived using a system-wide RSA public key system. The unique key is based on both the smart card holder's password and a unique identifier. The unique key is not stored in the smart card. Instead, the smart card stores a function of the unique key and the user's password. In an off-line transaction, the user-entered PIN', if entered correctly, unlocks the secret key. The unique secret key then is used to generate a signature on a message or challenge that may be issued to the smart card by the terminal into which the card is inserted. The terminal can verify the signature using publicly known information. The signature verifies if the correct password is entered and the smart card is initialized with the secret key.

In accordance with various embodiments of a security system, an off-line PIN verification technique for smart card systems uses identity-based signatures. Two operating modes are described. In a first mode, a smart card verifies a PIN to unlock the card for further use in a transaction. The card contains sufficient information to verify the PIN before proceeding. The terminal passes the entered PIN to the smart card and then performs no further operations.

In a second mode, the smart card uses the PIN to prove authenticity to the terminal. The smart card possesses a system secret key created at card enrollment. The card and/or the terminal determine whether the entered PIN is appropriate with respect to the reference PIN established at enrollment.

Figure 1:
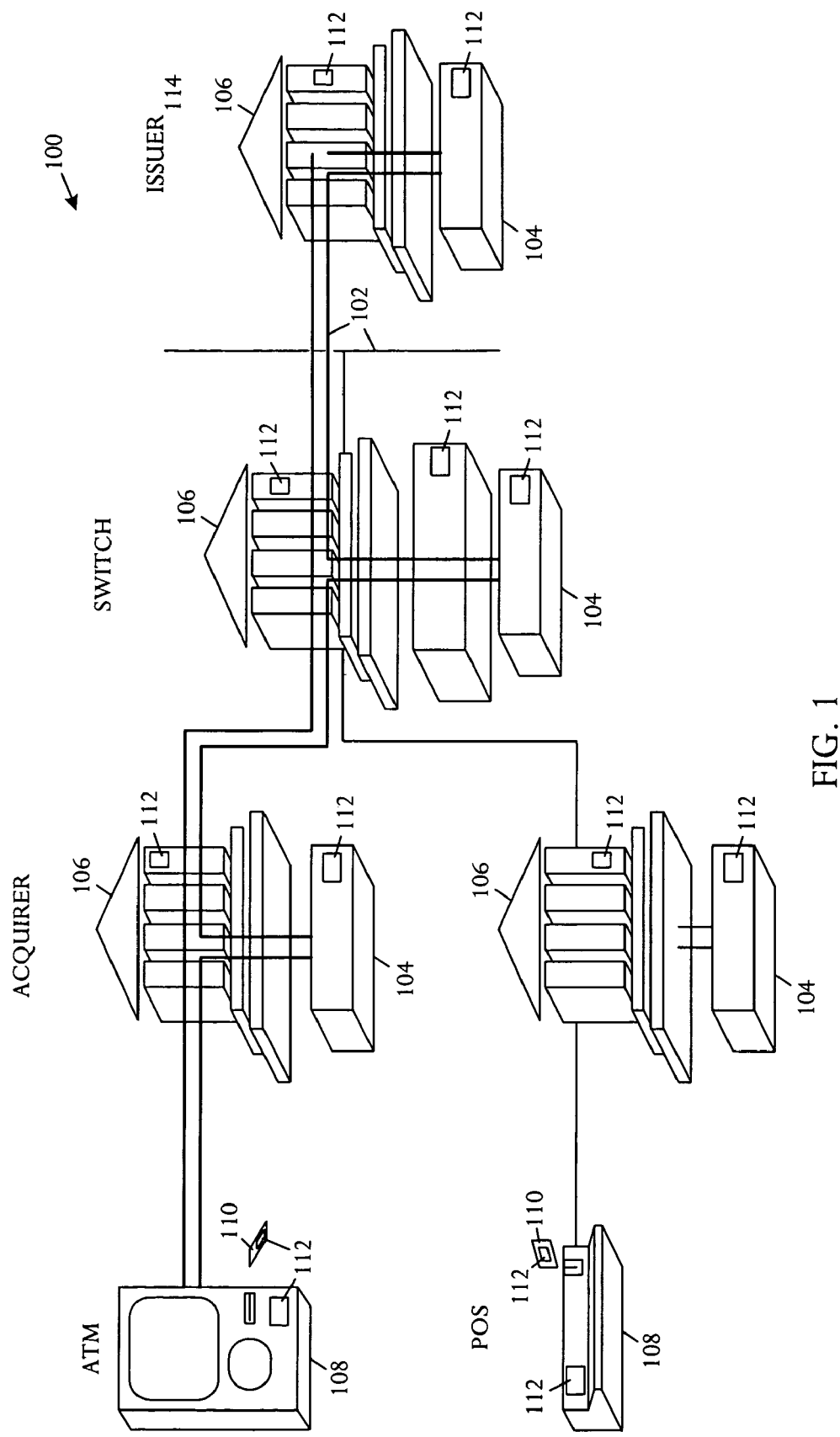
FIG. 1 is a schematic block diagram illustrating an embodiment of a transaction system that can be used for off-line PIN verification using Identity-Based Signatures.

Referring to FIG. 1, a schematic block diagram illustrates an embodiment of a transaction system 100 that can be used for off-line PIN verification using Identity-Based Signatures. The transaction system 100 comprises a network 102, a plurality of servers 104 and/or hosts 106 mutually coupled to the network, and a plurality of terminals 108 that can be coupled to the servers 104 via the network 108. The terminals 108 are capable of performing off-line PIN verification. The transaction system 100 further comprises a plurality of smart cards 110 that can be enrolled in the transaction system 100 and can be inserted into the terminals 108 for performing transactions. The transaction system 100 further comprises a plurality of processors 112 distributed among the smart cards 110, the servers 104, hosts 106, and/or the terminals 108. At least one of the processors 112 can perform a method for off-line Personal Identification Number (PIN) verification comprising creating a unique secret key for an enrolled smart card using a card issuer private RSA key, and generating signatures on an entered PIN using the unique key. The signatures are verifiable by the smart card 110 and/or an off-line terminal 108.

The servers 104, hosts 106, terminals 108, smart cards 110, and processors 112 are numbered generically for simplicity of illustration and to avoid unwieldy numeration in the text, although various different types of devices and components may be and typically are implemented in a particular transaction system 100. For example, a processor 112 within a smart card 100 is typically very different from a processor 112 in a terminal 108, server 104, or host 106.

A basic premise of a secure system is that an identifier, such as a Personal Identification Number (PIN), is something that is known only to a customer, is not written down, and particularly is not carried within the token, such as a smart card or magnetic stripe card, which the customer presents to initiate a transaction.

The security technique of identity-based signatures for off-line PIN verification using a smart card enables PIN verification without storing the PIN on the card through usage of a cryptographic technique termed Identity-Based Signatures. Using the illustrative technique, the PIN can be verified while the PIN remains concealed. The technique is consistent with several other security criteria. A key stored in the card is a unique key per card so that exposure of a key for a particular card does not compromise other cards or systems. Another security criterion is that for any key stored in the terminal, exposure of that key should not compromise the security or integrity of any card.

In one possible mode of usage, the PIN can be used simply to unlock the smart card. The card contains sufficient information to verify the PIN before proceeding to any transaction. In this mode, the PIN is simply passed to the card by the terminal after entry, after which the terminal can perform no other operations in the transaction or process. In the first operating mode, the PIN unlocks the smart card based on a derived digital signature quantity S. If the PIN verifies, the smart card unlocks and a transaction is allowed. Otherwise the smart card remains locked. A one-time enrollment process is used to establish data sufficient to perform independent PIN verification on the smart card.

In another mode, the terminal continues to perform operations after the smart card is unlocked. The smart card enables PIN verification by demonstrating two conditions. Interactions by the smart card demonstrate that the card possesses a secret key that was created and installed in the card at the time of card enrollment in the system. Simultaneously, the smart card demonstrates that the PIN entered by a customer is the correct PIN. Verification of the PIN is attained without having the PIN stored in the smart card. Also, verification can be performed without the terminal having to store any secret keys. To further ensure security, the card does not reveal the secret key to the terminal. The card only demonstrates possession of the key. In the second operating mode, the PIN is verified by the terminal based on a derived digital signature pair S, t. A one-time enrollment process loads sufficient information to the smart card to perform PIN verification.

Referring to FIG. 2A, a flow chart shows an embodiment of a technique for off-line PIN verification 200 using a smart card accessed on an off-line terminal. The method comprises creating 202 a unique secret key for an enrolled smart card using a card issuer private RSA key, and generating 204 signatures on an entered PIN using the unique key. The signatures are verifiable by the smart card and/or the terminal.

Referring to FIG. 2B, a flow chart depicts an embodiment of a technique for enrolling 210 a smart card in a system for off-line PIN verification. The method comprises entering 212 an initialization PIN to the smart card at an enrollment system and generating 214 a reference signature on the initialization PIN using the unique key and the initialization PIN. The reference signature is stored 216 on the smart card and the PIN is discarded 218 after signature generation.

Referring to FIG. 2C, a flow chart illustrates an embodiment of a technique for off-line PIN verification 220 of an enrolled smart card. The method comprises communicatively connecting 222 the smart card to an off-line terminal and receiving 224 a transaction PIN' at the off-line terminal. A candidate signature is generated 226 on the transaction PIN' using the unique key and the candidate signature is verified 228 against the reference signature.

Figures 3A, 3B:
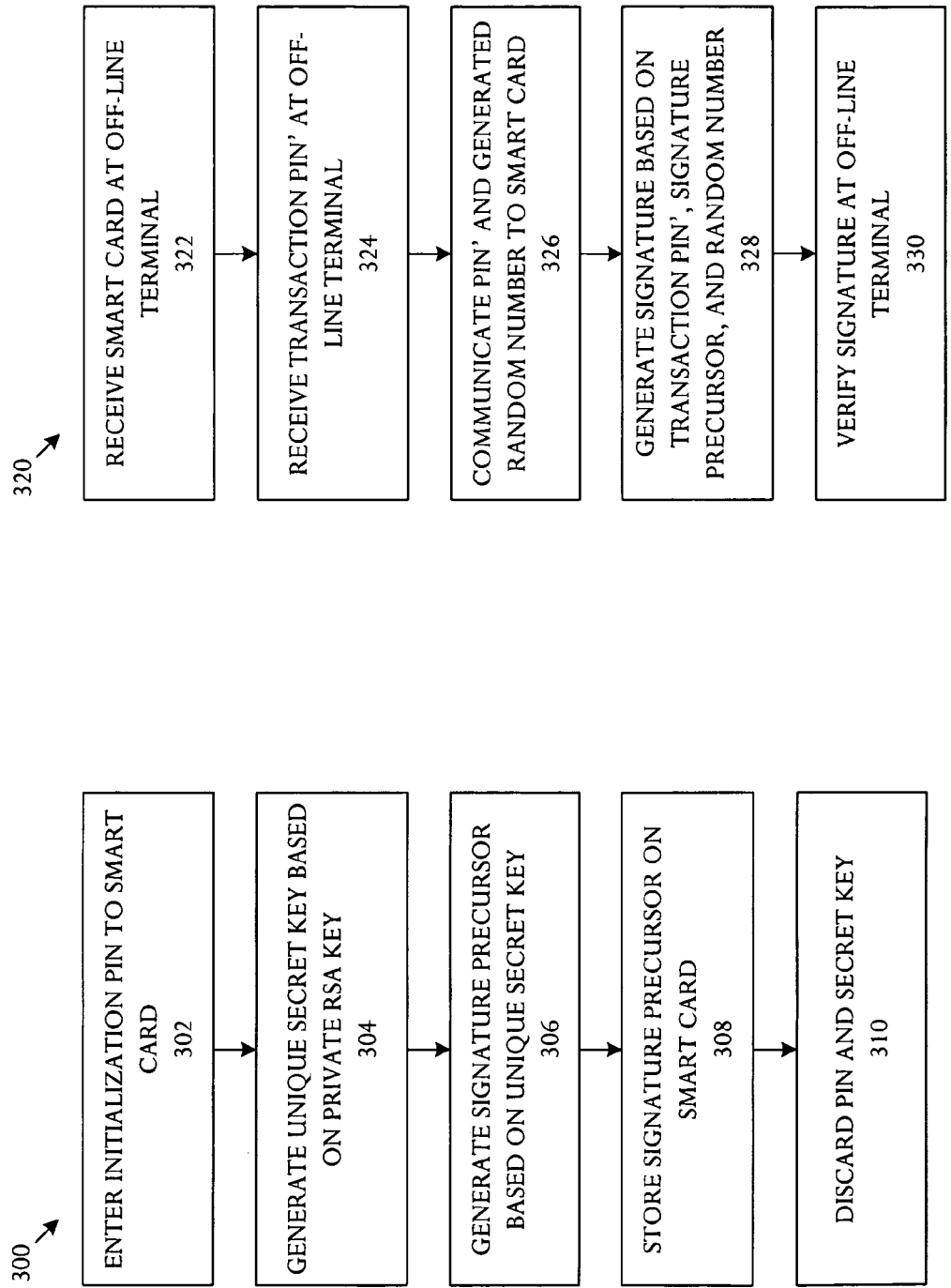
FIGS. 3A and 3B are flow charts that depict another embodiment of a method for enrolling a smart card in an off-line PIN verification technique.

Referring to FIG. 3A, a flow chart shows another embodiment of a method for enrolling a smart card 300 in an off-line PIN verification technique. The method comprises entering an initialization PIN 302 to the smart card at an enrollment system, generating the unique secret key based on the private RSA key 304, and generating at least one signature precursor from the unique secret key 306. The method further comprises storing the one or more signature precursors on the smart card 308 and discarding the PIN and the unique secret key 310.

Referring to FIG. 3B, a flow chart illustrates an embodiment of a method for verifying a Personal Identification Number at an off-line terminal 320. The method comprises communicatively connecting the smart card to an off-line terminal 322, receiving a transaction PIN' at the off-line terminal 324, and communicating the transaction PIN' and an off-line terminal-generated random number to the smart card 326. The method further comprises generating a signature 328 on the smart card based on the transaction PIN', one or more signature precursor, and the random number. The method further comprises verifying the signature at the off-line terminal 330.

Figure 4A:
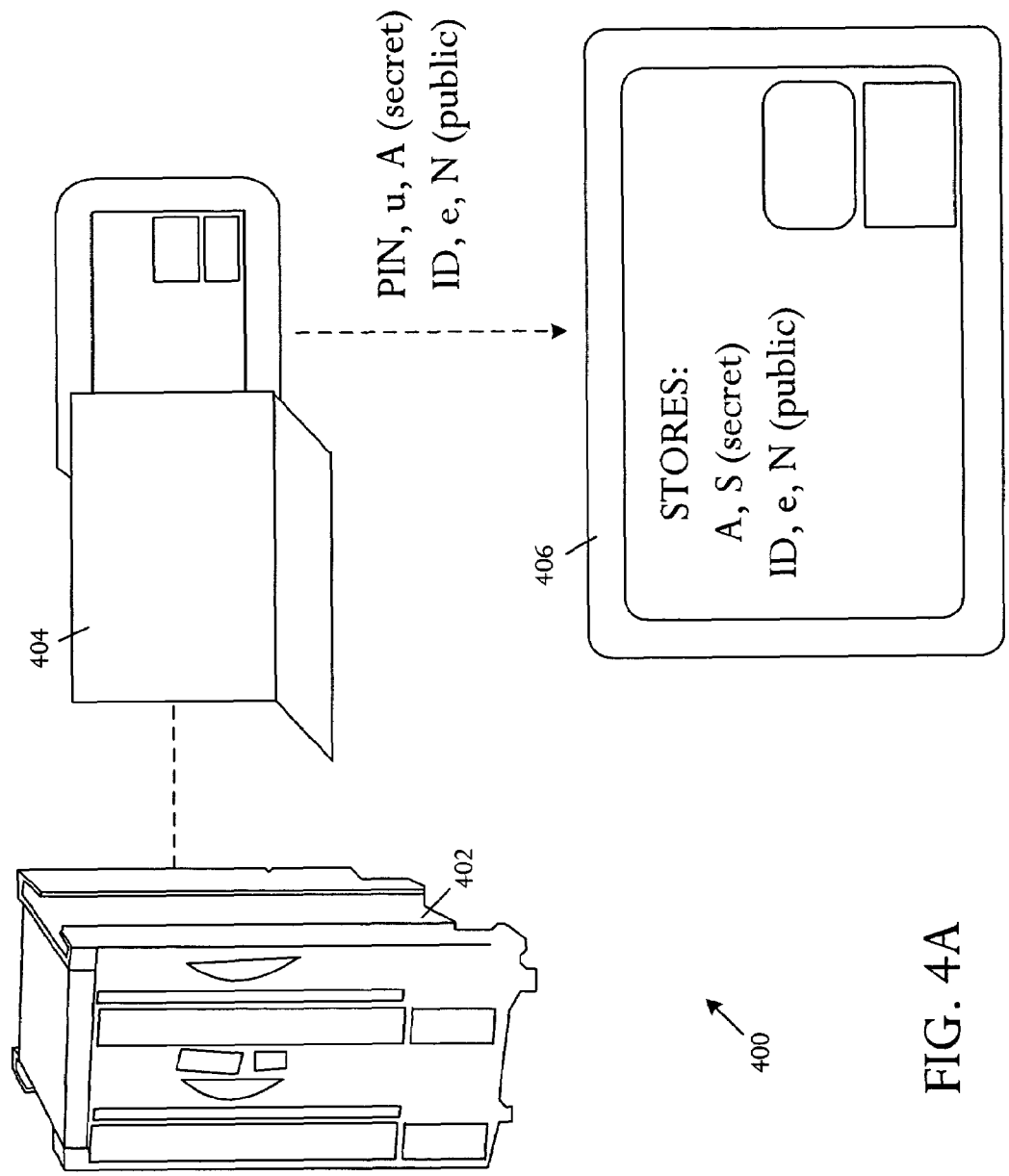
FIGS. 4A and 4B are schematic pictorial block diagrams that illustrate an embodiment of a transaction system capable of usage in off-line PIN verification using Identity-Based Signatures in a first mode of operation.
Figure 4B:
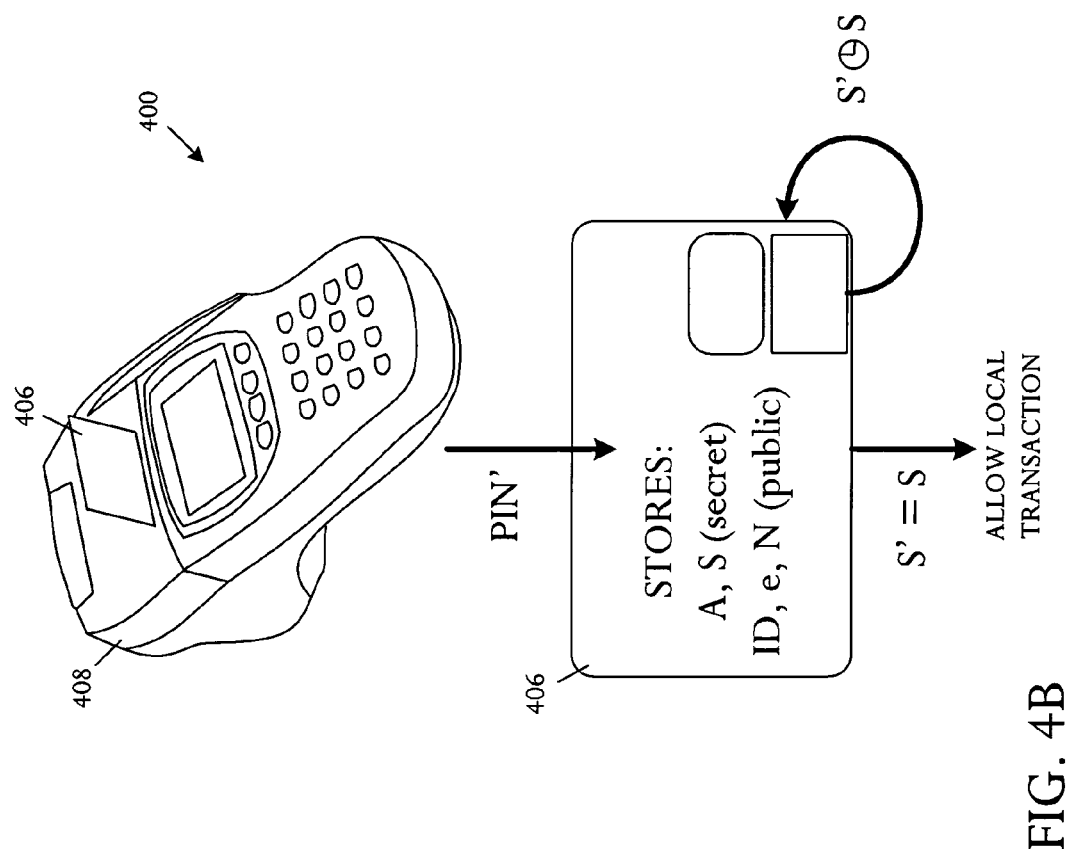

Referring to FIGS. 4A and 4B, schematic pictorial block diagrams illustrate an embodiment of a transaction system 400 capable of usage in off-line PIN verification using Identity-Based Signatures in a first mode of operation. In the first mode, a user enters a Personal Identification Number (PIN) at a terminal and the smart card verifies the PIN to unlock the card for a subsequent transaction. A terminal passes the PIN to the card to begin the process but can otherwise perform little or no role in the verification process.

FIG. 4A depicts an embodiment of a smart card enrollment process in the first mode. The system 400 includes an enrollment server 402 or host, and a smart card writer 404. A smart card 406 is shown that can be inserted into the card writer 404 for enrollment. The purpose of the enrollment process is to place all appropriate data on the smart card that is useful to perform PIN verification at the time of a transaction that is independent of communication with a financial network. If the PIN verifies, the smart card proceeds to perform a desired transaction. If the PIN does not verify, then the card discontinues operation and does not perform a transaction.

To begin card enrollment, the enrollment system or server 402 uses a private key d to compute a secret key u according to an equation of the form:

$$u = I^d \pmod{N},$$

where I is an entity's identifier such as a customer ID, a Private Account Number (PAN), account number, bank system card number, and the like. Parameter d is a private exponent in an RSA system that is known only to the enrollment system. N is the modulus for the RSA system, a product of two or more large prime numbers, and is a public parameter. Secret key u is a key generated by the RSA system that is unique to each smart card. Secret key u is not an RSA key, but rather is used by the smart card to generate digital signatures. The key is not stored directly on the card.

The enrollment server 402 also computes a value A according to an equation of the form:

$$A = PIN^{-1} \cdot u \pmod{N},$$

where A is a product value that is stored on the smart card for subsequent usage as a PIN verification precursor. The secret values of the Personal Identification Number (PIN), the secret key u, and the precursor A are communicated to the smart card 406, for example via a smart card writer 404, along with public values including a public exponent e in the RSA system, the modulus N, and the entity-identifier I.

The smart card 406 uses the received values to compute a digital signature defined by a signature pair S, t. The smart card computes the digital signature using an equation of the form:

$$t = PIN^e \pmod{N}.$$

The smart card 406 continues computation of the digital signature by hashing Z=h(t, PIN, I) which is then used to compute the signature S according to an equation of the form:

$$S = u \cdot PIN^Z \pmod{N}.$$

One example of a suitable hash function is the Secure Hash Algorithm SHA-1 hash function promulgated by the National Institute of Standards and Technology in FIPS PUB 180-1.

Signature value S is a reference signature and is stored in the smart card 406. Accordingly, during enrollment, the smart card 406 is loaded with the quantities including signature precursor A, signature S, entity-identifier I, and modulus N. Values including the Personal Identification Number (PIN), secret key u, signature t, and hash Z are erased from the smart card 406. The smart card 406 is initialized and can perform the function of verifying entered PINs off-line at a financial transaction terminal.

FIG. 4B is a schematic pictorial diagram showing an embodiment of a PIN verification process in the first mode. A customer inserts the smart card 406 into a terminal 408 that is operating off-line, and enters a Personal Identification Number designated herein as PIN' to begin a transaction. The smart card 406 computes three quantities including a secret key u', a signature value t', and a hash value Z', all that correspond to the entered PIN' rather than the reference PIN used in enrollment. The quantities are computed according to equations of the form:

$$u' = PIN' \cdot A \pmod{N},$$

$$t' = (PIN')^e \pmod{N}, \text{ and}$$

$$Z' = h(t', PIN', I).$$

The smart card 406 uses the secret key u', the signature value t', and the hash value Z' to compute a candidate signature using an equation of the form:

$$S' = u' \cdot (PIN')^{Z'} \pmod{N}.$$

If the candidate signature S' computed by the smart card 406 is equal to the reference signature S stored in the smart card 406 during enrollment, then the entered PIN' is equal to the reference PIN so that the Personal Identification Number is verified. PIN verification unlocks the smart card 406 for transacting.

Figure 5A:
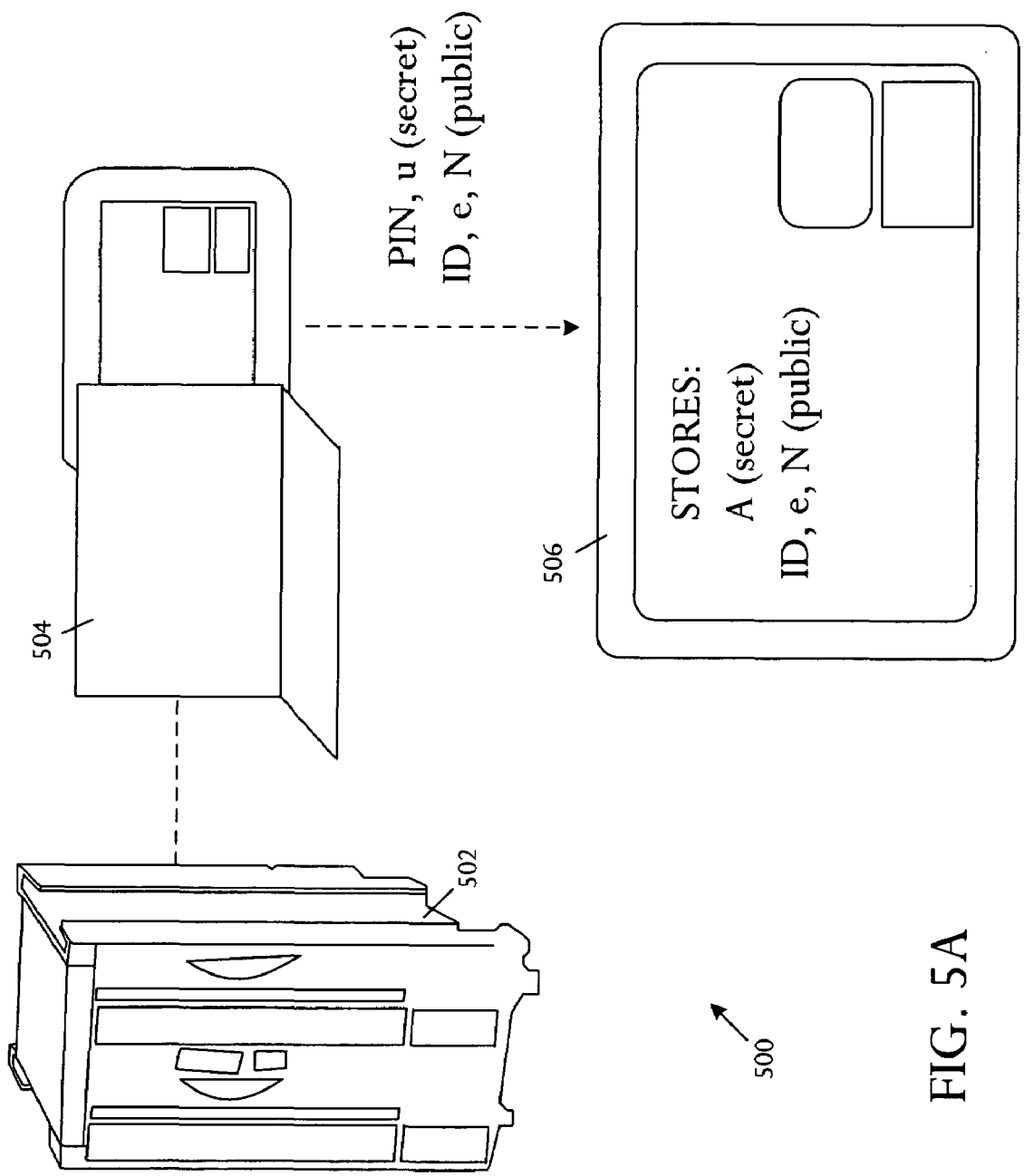
FIGS. 5A and 5B are schematic pictorial diagrams showing an embodiment of a transaction system capable of usage in off-line PIN verification using Identity-Based Signatures in a second mode of operation.
Figure 5B:
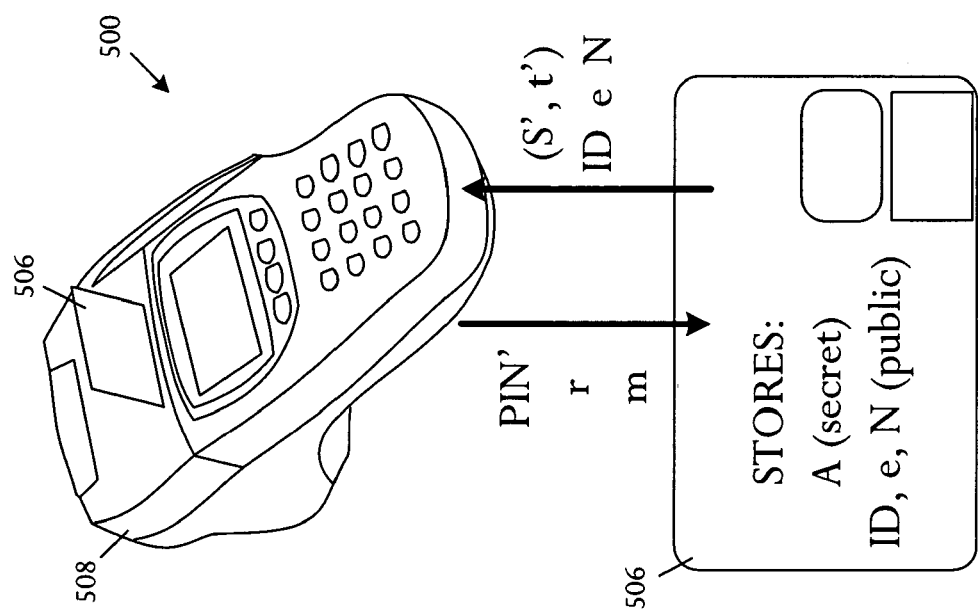

Referring to FIGS. 5A and 5B, schematic pictorial block diagrams illustrate an embodiment of a transaction system 500 capable of usage in off-line PIN verification using Identity-Based Signatures in a second mode of operation. In the second mode, a terminal has an active role in verifying that the smart card holds appropriate secret key values established during an enrollment process and that the Personal Identification Number (PIN) is valid.

FIG. 5A depicts an embodiment of a smart card enrollment process in the second mode. The system 500 includes an enrollment server 502 or host, and a smart card writer 504. A smart card 506 is shown that can be inserted into the card writer 504 for enrollment. To begin enrollment, the enrollment system 500, using a RSA system private key d that is associated to the system, computes a secret key u according to an equation of the form:

$$u = I^d \pmod{N}.$$

where I, as for the first mode, is an entity's identifier such as a customer ID, a Private Account Number (PAN), account number, bank system card number, and the like.

The enrollment system 500, via a smart card writer 504, sends the secret key u, the entity-identifier I, the RSA public exponent e, and the RSA system modulus N to the smart card 506. The enrollment system 500 also sends the entity or customer-selected Personal Identification Number (PIN) to the smart card 506.

The smart card 506 uses the selected PIN, the secret key u, and the modulus to compute a signature precursor A according to an equation of the form:

$$A = PIN^{-1} \cdot u \pmod{N}.$$

The secret key u and the secret PIN are erased by the smart card 506, and the secret signature precursor A is retained in the smart card 506.

Following enrollment, the smart card 506 stores the RSA public exponent e, the RSA system modulus N, the signature precursor A, and the entity-identifier I, and is ready to perform off-line PIN verification.

FIG. 5B is a schematic pictorial diagram showing an embodiment of a PIN verification process in the second mode. A customer inserts the smart card 506 into a terminal 508 that is operating off-line, and enters a Personal Identification Number designated herein as PIN' to begin a transaction. The protocol of the second mode is for the terminal 508 to determine whether the entity or customer-entered PIN' is capable of unlocking the secret key u assigned to the smart card 506 at the time of enrollment.

The terminal 508 generates a random number $r_t$ and sends the random number $r_t$ to the smart card 506 in combination with the PIN' entered into the terminal 508 by the customer. The terminal 508 waits for the response from the smart card 506. The smart card 506 receives the input data and generates a signature by performing multiple operations.

The smart card 506 also generates a random number $r_c$. First the smart card 506 uses the entered PIN', and the random numbers $r_t$ and $r_c$ according to equations:

$$t=(r_t \cdot r_c \cdot \text{PIN'})^e (\bmod N),$$

$$u'=\text{PIN'} \cdot A (\bmod N),$$

$$z=h(t, \text{PIN'}, I), \text{ and}$$

$$S=u'\cdot(r_t \cdot r_c \cdot \text{PIN'})^z (\bmod N).$$

where h( ) is any suitable hashing algorithm.

The smart card 506 sends the signature S and t to the terminal 508. The terminal computes three quantities including a hash function z=h(t, PIN, I), a hash performed on the entity-identifier and signature $C=I \cdot t^z (\bmod N)$; and a function of the signature $S^e (\bmod N)$. If $S^e=C (\bmod N)$, then the signature generated by the smart card 506 is verified, and the correct PIN' is entered.

Figure 6:
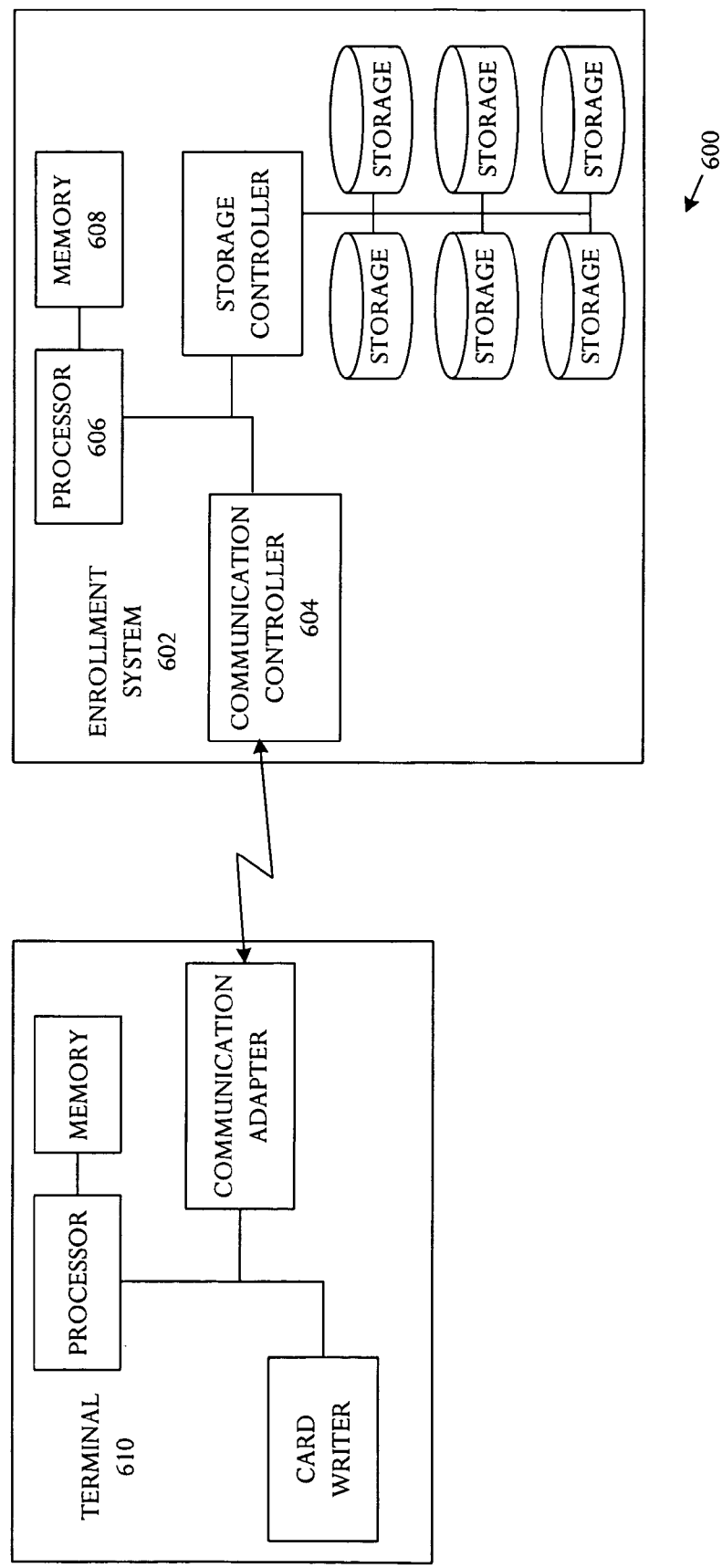
FIG. 6 is a schematic block diagram that illustrates an embodiment of a data security apparatus with an enrollment system capable of usage for off-line Personal Identification Number (PIN) verification using a smart card accessed on an off-line terminal.

Referring to FIG. 6, a schematic block diagram illustrates an embodiment of a data security apparatus 600 comprising an enrollment system 602 capable of usage for off-line Personal Identification Number (PIN) verification using a smart card accessed on an off-line terminal. The enrollment system 602 comprises a communication interface 604 that can communicate with a terminal 610 configured to accept a smart card that executes off-line Personal Identification Number (PIN) verification, a processor 606 coupled to the communication interface 604, and a memory 608. The memory 608 is coupled to the processor 606 and contains a computable readable program code capable of causing the processor 606 to initialize and personalize a smart card for usage in creating a unique secret key for an enrolled smart card using a card issuer private RSA key. The code also causes the processor 606 to generate signatures on an entered PIN using the unique key. The signatures are verifiable by the smart card and/or the terminal.

Figure 7:
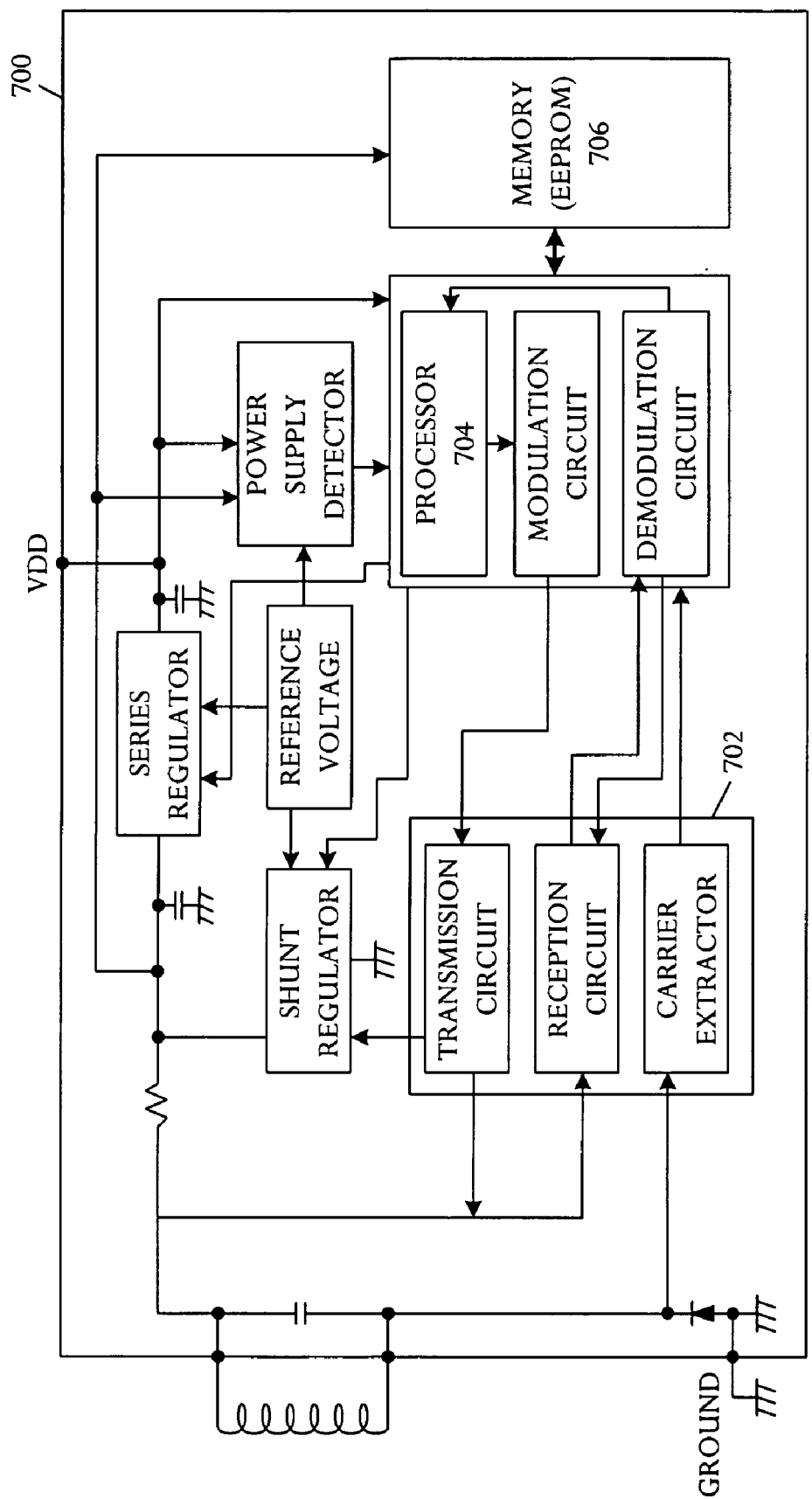
FIG. 7 is a schematic block diagram depicting an embodiment of a data security apparatus in the form of a smart card capable of off-line Personal Identification Number (PIN) verification.

Referring to FIG. 7, a schematic block diagram illustrates an embodiment of a data security apparatus in the form of a smart card 700 capable of off-line Personal Identification Number (PIN) verification. The smart card 700 comprises an interface 702 capable of communicating with an off-line terminal and an enrollment system, a processor 704 coupled to the interface 702, and a memory 706. The memory 706 is coupled to the processor 704 and contains a computable readable program code that executes off-line PIN verification based on creating a unique secret key for an enrolled smart card using a card issuer private RSA key, and generating signatures on an entered PIN using the unique key. The signatures are verifiable by the smart card and/or the off-line terminal.

In a first operating mode, during enrollment the computable readable program code directs the processor 704 to receive an initialization PIN from the enrollment system, generate a reference signature on the initialization PIN using the unique key, store the reference signature on the smart card that is generated from the PIN, and discard the PIN without storage after signature generation.

In the first operating mode during a transaction, the computable readable program code directs the processor 704 to receive a transaction PIN' entered by an entity such as a customer via the off-line terminal, generate a candidate signature on the transaction PIN' using the unique key, and verify the candidate signature against the reference signature. The processor 704 can further be directed to enable a transaction for a verified candidate signature.

In a second operating mode, the computable readable program code directs the processor 704 during enrollment to receive an initialization PIN from the enrollment system, generate the unique secret key based on the private RSA key and the initialization PIN, and generate at least one signature precursor from the unique secret key. The processor 704 also stores the signature precursors in the memory 706 and erases the PIN and the unique secret key without storage.

In a transaction in the second operating mode, the computable readable program code directs the processor 706 to receive a transaction PIN' and a random number from the off-line terminal, and generate a signature based on the transaction PIN', the at least one signature precursor, and the random number. The processor 706 sends the signature to the off-line terminal for verification.

Figure 8:
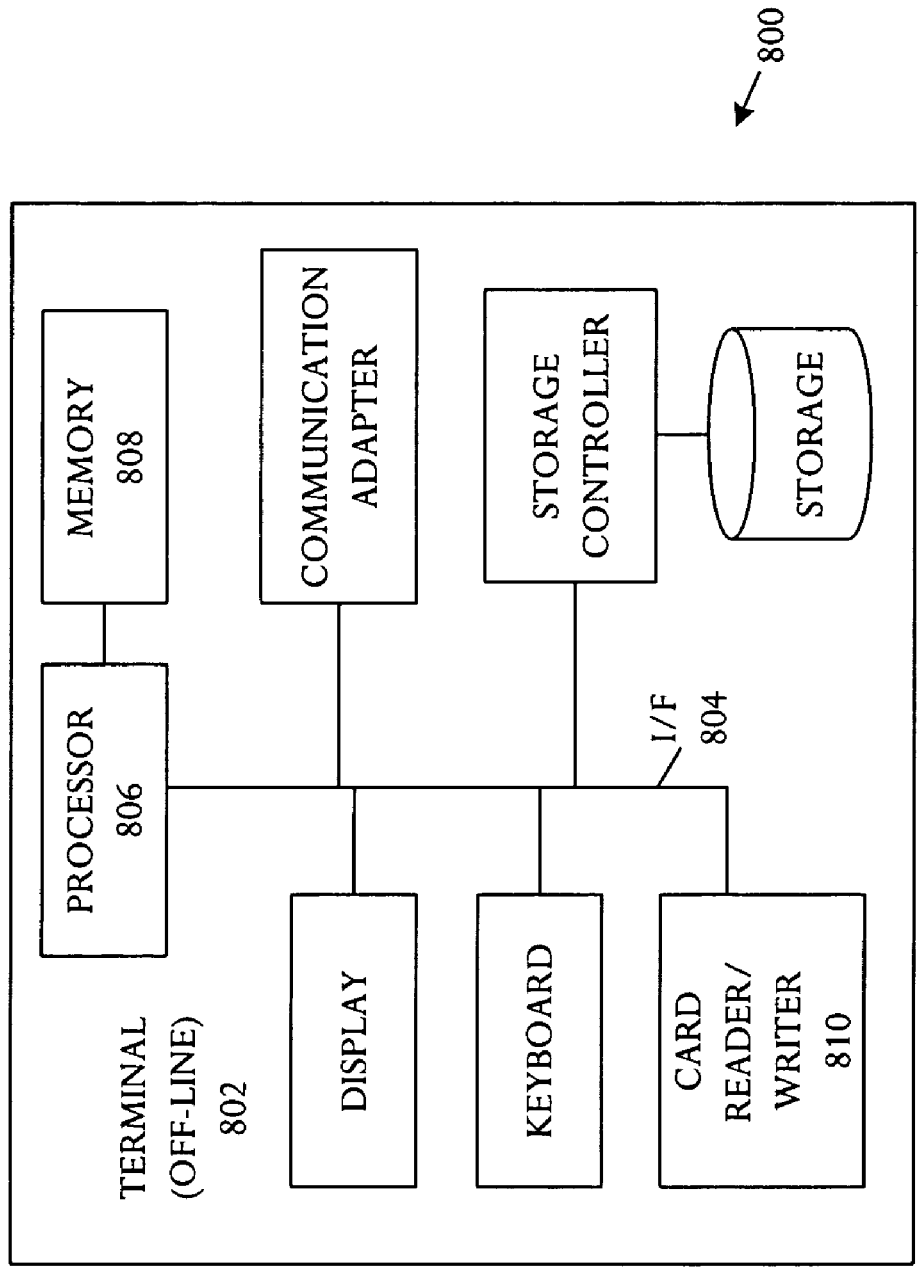
FIG. 8 is a schematic block diagram that illustrates an embodiment of a data security apparatus including an off-line terminal capable of usage for off-line Personal Identification Number (PIN) verification using a smart card.

Referring to FIG. 8, a schematic block diagram illustrates an embodiment of a data security apparatus 800 including an off-line terminal 802 capable of usage for off-line Personal Identification Number (PIN) verification using a smart card. The off-line terminal 802 comprises an interface 804 that can accept and communicate with a smart card that executes off-line Personal Identification Number (PIN) verification, a processor 806 coupled to the interface 804, and a memory 808. The memory 808 is connected to the processor and contains a computable readable program code capable of causing the processor 806 to interact with the smart card, typically via a card reader/writer 810, to verify an entity-entered PIN using a signature generated on a reference PIN. The signature is generated based on a unique secret key of an enrolled smart card derived from a card issuer private RSA key.

In the first operating mode, the computable readable program code directs the processor 806 to communicate with the smart card, receive a transaction PIN' entered by an entity such as a customer, and operate in combination with the smart card to generate a candidate signature on the transaction PIN' using the unique key, thereby verifying the candidate signature against a reference signature.

In the second operating mode, the computable readable program code directs the processor to communicate with the smart card, receive a transaction PIN' entered by the entity or customer, generate a random number, and communicate the transaction PIN', and the random number to the smart card. The processor 806 operates in conjunction with the smart card to generate a signature based on the transaction PIN', the signature precursors, and the random number to verify the signature.

The various functions, processes, methods, and operations performed or executed by the system can be implemented as programs that are executable on various types of processors, controllers, central processing units, microprocessors, digital signal processors, state machines, programmable logic arrays, and the like. The programs can be stored on any computer-readable medium for use by or in connection with any computer-related system or method. A computer-readable medium is an electronic, magnetic, optical, or other physical device or means that can contain or store a computer program for use by or in connection with a computer-related system, method, process, or procedure. Programs can be embodied in a computer-readable medium for use by or in connection with an instruction execution system, device, component, element, or apparatus, such as a system based on a computer or processor, or other system that can fetch instructions from an instruction memory or storage of any appropriate type. A computer-readable medium can be any structure, device, component, product, or other means that can store, communicate, propagate, or transport the program for use by or in connection with the instruction execution system, apparatus, or device.

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims. For example, although particular equations with specific variable are disclosed to describe various operations, the operations performed can be described otherwise, either mathematically or non-mathematically. The operations, if described mathematically, can be modeled using other equations and/or variables. Furthermore, the disclosed examples describe data security operations in a financial system context. In other embodiments, the disclosed techniques and systems can be applied in various other data security settings, including general application to passwords, and possibly biometric data, and other forms of identification.

What is claimed is:

1. A method for off-line Personal Identification Number (PIN) verification using a smart card accessed on an off-line terminal, the method comprising:

creating a unique secret key for an enrolled smart card using a card issuer private key;
generating signatures on an entered PIN using the unique key, the signatures being verifiable by the smart card and/or the terminal;
entering an initialization PIN to the smart card at an enrollment system;
generating a reference signature on the initialization PIN using the unique key and the initialization PIN;
storing the reference signature on the smart card; and
discarding the PIN after signature generation.

2. The method according to claim 1 further comprising:
communicatively connecting the smart card to an off-line terminal;
receiving a transaction PIN' at the off-line terminal;
generating a candidate signature on the transaction PIN' using the unique key; and
verifying the candidate signature against the reference signature.

3. The method according to claim 2 further comprising:
for a verified candidate signature, unlocking the smart card to enable a transaction.

4. A method for off-line Personal Identification Number (PIN) verification using a smart card accessed on an off-line terminal, the method comprising:

creating a unique secret key for an enrolled smart card using a card issuer private key;
generating signatures on an entered PIN using the unique key, the signatures being verifiable by the smart card and/or the terminal;
entering an initialization PIN to the smart card at an enrollment system;
generating the unique secret key based on the private key;
generating at least one signature precursor from the unique secret key;
storing the at least one signature precursor on the smart card; and
discarding the PIN and the unique secret key.

5. The method according to claim 4 further comprising:
communicatively connecting the smart card to an off line terminal;
receiving a transaction PIN' at the off-line terminal;
communicating the transaction PIN' and an off-line terminal-generated random number to the smart card;
generating a signature on the smart card based on the transaction PIN', the at least one signature precursor, and the random number; and
verifying the signature at the off-line terminal.

6. A method for off-line Personal Identification Number (PIN) verification using a smart card accessed on an off-line terminal, the method comprising:

using PIN verification to unlock a smart card;
enabling the unlocked smart card to perform a selected function in a financial transaction for a cardholder;
creating a unique secret key for an enrolled smart card using a card issuer private key;
generating signatures on an entered PIN using the unique key, the signatures being verifiable by the smart card and/or the terminal;
computing at an enrollment system a secret key u that is unique to the smart card using an equation of the form:

$$u = I^d (\bmod N),$$

where I is an entity-identifier, d is a private exponent in an RSA system known only to the enrollment system, and N is an RSA system modulus;

computing at the enrollment system a signature precursor A using an equation of the form:

$$A = \text{PIN} \cdot u \pmod{N},$$

where PIN is an enrollment Personal Identification Number (PIN);

storing on the smart card the signature precursor A, a public exponent e, the modulus N, and the entity-identifier I;

computing at the smart card a digital signature component t using an equation of the form:

$$t = \text{PIN}^e \pmod{N}$$

hashing at the smart card a function Z=h(t, PIN, I) to compute a reference signature of the form:

$$S = u \cdot \text{PIN}^Z \pmod{N},$$

where h( ) is a hashing algorithm;

storing the reference signature S on the smart card; and erasing from the smart card the enrollment PIN, the secret key u, the digital signature component t, and function Z.

7. The method according to claim 6 further comprising:

communicatively connecting a smart card to a transaction terminal;

receiving at the transaction terminal a transaction PIN';

computing at the smart card a transaction secret key u', a transaction digital signature component t and a transaction function Z', using respective equations of the form:

$$u' = \text{PIN}' \cdot A \pmod{N},$$

$$t' = (\text{PIN}')^e \pmod{N}, \text{ and}$$

$$Z' = h(t'\text{PIN}', I);$$

computing at the smart card a candidate signature S' using an equation of the form:

$$S' = u' \cdot (\text{PIN}'^{Z'} \pmod{N};$$

for S'=S so that PIN'=PIN, verifying PIN'; and unlocking the smart card for a transaction for a verified PIN'.

8. The method according to claim 6 wherein:

the smart card contains sufficient information to verify an entered PIN prior to proceeding to a transaction; and the PIN is passed from a transaction terminal to the smart card and remaining verification operations are performed on the smart card.

9. A method for off-line Personal Identification Number (PIN) verification using a smart card accessed on an off-line terminal, the method comprising:

creating a unique secret key for an enrolled smart card using a card issuer private key;

generating signatures on an entered PIN using the unique key, the signatures being verifiable by the smart card and/or the terminal; and enabling a financial terminal to perform a challenge-response protocol to determine whether the smart card and an entered transaction PIN' are valid for a financial transaction to proceed.

10. The method according to claim 9 further comprising:

computing at an enrollment system a secret key u that is unique to the smart card using an equation of the form:

$$u = I^d \pmod{N},$$

where I is an entity-identifier, d is a private exponent in an RSA system known only to the enrollment system, and N is an RSA system modulus;

transferring from the enrollment system to the smart card the secret key u, the identity-identifier I, a public exponent e, and the modulus N, and an entity-selected Personal Identification Number (PIN);

computing at the smart card a signature precursor A using an equation of the form:

$$A = \text{PIN}^{-1} \cdot u \pmod{N}; \text{ and}$$

storing on the smart card the signature precursor A, a public exponent e, the modulus N, and the entity-identifier I.

11. The method according to claim 10 further comprising:

communicatively connecting a smart card to a transaction terminal;

receiving at the transaction terminal the transaction PIN';

transferring from the transaction terminal to the smart card a random number $r_t$ generated at the transaction terminal, and an entity-entered PIN';

waiting at the transaction terminal for a response;

generating at the smart card a random number $r_c$;

computing at the smart card a transaction digital signature component t, a transaction secret key u', a hash function Z, and a signature S using respective equations of the form:

$$t = (r_t \cdot r_c \cdot \text{PIN}')^e \pmod{N},$$

$$u' = \text{PIN}' \cdot A \pmod{N},$$

$$Z = h(t, \text{PIN}', I)$$

$$S = u' \cdot (r_t \cdot r_c \cdot \text{PIN}')^Z \pmod{N},$$

where h( ) is a hashing algorithm;

transferring from the smart card to the transaction terminal the signature S and the digital signature component t;

computing at the transaction terminal values Z=h(t, PIN', I); $C = I \cdot t^Z \pmod{N}$; and $S^e \pmod{N}$;

determining at the transaction terminal whether $S^e = C \pmod{N}$, and if so, verifying the smart card-generated signature S, affirming that PIN' is equal to PIN.

12. The method according to claim 9 wherein:

the smart card on PIN verification performs operations that verify smart card possession of a secret key created and installed at enrollment of the card, and that verify that the transaction PIN' entered by an entity matches the PIN at enrollment;

the verification operations are performed without having the enrollment PIN stored on the smart card; and verification occurs without the smart card revealing the secret key to the transaction terminal.

13. The method according to claim 6 wherein:

the card issuer private key is an RSA (Rivest, Shamir, and Adelman Public Key Cryptosystem) key.

14. A data security apparatus comprising:

a smart card capable of off-line Personal Identification Number (PIN) verification comprising:

an interface capable of communicating with an off-line terminal and an enrollment system;

a processor coupled to the interface; and a memory coupled to the processor and having a computable readable program code embodied therein that executes off-line PIN verification based on creating a unique secret key for an enrolled smart card using a card issuer private key and generating signatures on an entered PIN using the unique key, the signatures being verifiable by the smart card and/or the off-line terminal.

15. The apparatus according to claim 14 wherein the memory further comprises:
   a computable readable program code capable of causing the processor to receive an initialization PIN from the enrollment system;
   a computable readable program code capable of causing the processor to generate a reference signature on the initialization PIN using the unique key;
   a computable readable program code capable of causing the processor to store the reference signature on the smart card that is generated from the PIN; and
   a computable readable program code capable of causing the processor to discard the PIN without storage after signature generation.

16. The apparatus according to claim 15 wherein the memory further comprises:
   a computable readable program code capable of causing the processor to receive a transaction PIN' via the off-line terminal;
   a computable readable program code capable of causing the processor to generate a candidate signature on the transaction PIN' using the unique key; and
   a computable readable program code capable of causing the processor to verify the candidate signature against the reference signature.

17. The apparatus according to claim 16 wherein the memory further comprises:
   a computable readable program code capable of causing the processor to enable a transaction for a verified candidate signature.

18. The apparatus according to claim 14 wherein the memory further comprises:
   a computable readable program code capable of causing the processor to receive an initialization PIN from the enrollment system;
   a computable readable program code capable of causing the processor to generate the unique secret key based on the private key and the initialization PIN;
   a computable readable program code capable of causing the processor to generate at least one signature precursor from the unique secret key;
   a computable readable program code capable of causing the processor to store the at least one signature precursor in the memory; and
   a computable readable program code capable of causing the processor to erase the PIN and the unique secret key without storage.

19. The apparatus according to claim 18 wherein the memory further comprises:
   a computable readable program code capable of causing the processor to receive a transaction PIN' and a random number from the off-line terminal;
   a computable readable program code capable of causing the processor to generate a signature based on the transaction PIN', the at least one signature precursor, and the random number; and
   a computable readable program code capable of causing the processor to send the signature to the off-line terminal for verification.

20. The apparatus according to claim 14 wherein the memory further comprises:
   a computable readable program code capable of causing the processor to receive from an enrollment system a secret key u that is unique to the smart card and a signature precursor A, the secret key u being defined by an equation of the form:

$$u = I^d (\bmod N)$$

where I is an entity-identifier, d is a private exponent in an RSA system known only to the enrollment system, and N is an RSA system modulus, the signature precursor A being defined by an equation of the form:

$$A = PIN^{-1} \cdot u (\bmod N),$$

where PIN is an enrollment Personal Identification Number (PIN);
   a computable readable program code capable of causing the processor to store in the memory the signature precursor A, a public exponent e, the modulus N, and the entity-identifier I;
   a computable readable program code capable of causing the processor to compute a digital signature component t using an equation of the form:

$$t = PIN^e (\bmod N);$$

a computable readable program code capable of causing the processor to hash a function Z=h(t, PIN, I) to compute a reference signature of the form:

$$S = u \cdot PIN^Z (\bmod N),$$

where h( ) is a hashing algorithm;
   a computable readable program code capable of causing the processor to store the reference signature S in the memory; and
   a computable readable program code capable of causing the processor to erase the enrollment PIN, the secret key u, the digital signature component t, and function Z from memory.

21. The apparatus according to claim 20 wherein the memory further comprises:
   a computable readable program code capable of causing the processor to receive from the transaction terminal a transaction PIN';
   a computable readable program code capable of causing the processor to compute a transaction secret key u', a transaction digital signature component t', and a transaction function Z' using respective equations of the form:

$$u' = PIN' \cdot A (\bmod N),$$

$$t' = (PIN')^e (\bmod N), \text{ and}$$

$$Z' = h(t', PIN', I);$$

a computable readable program code capable of causing the processor to compute a candidate signature S' using an equation of the form:

$$S' = u' \cdot (PIN')^{Z'} (\bmod N);$$

a computable readable program code operative for S'=S so that PIN'=PIN and capable of causing the processor to verify PIN'; and
   a computable readable program code capable of causing the processor to enable a transaction for a verified PIN'.

22. The apparatus according to claim 14 wherein the memory further comprises:
   a computable readable program code capable of causing the processor to receive from an enrollment system a secret key u that is unique to the smart card, the identity-identifier I, a public exponent e, and the modulus N, and an entity-selected Personal Identification Number (PIN), the secret key u being defined by an equation of the form:

$u=I^d(\mod N)$, where I is an entity-identifier, d is a private exponent in an RSA system known only to the enrollment system, and N is an RSA system modulus;

a computable readable program code capable of causing the processor to compute a signature precursor A using an equation of the form:

$A=\text{PIN}^{-1}\cdot u(\mod N)$;

a computable readable program code capable of causing the processor to generate a random number $r_c$; and a computable readable program code capable of causing the processor to store in the memory the signature precursor A, a public exponent e, the modulus N, and the entity-identifier I.

23. The apparatus according to claim 22 wherein the memory further comprises:

a computable readable program code capable of causing the processor to receive from the transaction terminal a random number $r_t$ generated at the transaction terminal, and an entity-entered PIN ', and a random number $r_c$ generated in the smart card;

a computable readable program code capable of causing the processor to compute a transaction digital signature component t, a transaction secret key u', a hash function Z and a signature S, using respective equations of the form:

$t=(r_t \cdot r_c \cdot \text{PIN'})^e(\mod N)$, $u=\text{PIN'}\cdot A(\mod N)$, $Z=h(t, \text{PIN'}, I)$ $S=u'\cdot(r_t \cdot r_c \cdot \text{PIN'})^Z(\mod N)$, where h( ) is a hashing algorithm;

a computable readable program code capable of causing the processor to transfer from the smart card to the transaction terminal the signature S' and the digital signature component t;

a computable readable program code capable of causing the processor to compute at the transaction terminal values $Z=h(t, \text{PIN'}, I)$; $C=I\cdot t^Z(\mod N)$; and $S^e(\mod N)$; and a computable readable program code capable of causing the processor to determine at the transaction terminal whether $S^e=C(\mod N)$, and, if so, verify the signature S, affirming that PIN' is equal to PIN.

24. The apparatus according to claim 14 wherein:
the card issuer private key is an RSA (Rivest, Shamir, and Adelman Public Key Cryptosystem) key.

25. A data security apparatus comprising:
an enrollment system capable of usage for off-line Personal Identification Number (PIN) verification using a smart card accessed on an off-line terminal, the enrollment system comprising:
 a communication interface capable of communicating with a terminal configured to accept a smart card that executes off-line Personal Identification Number (PIN) verification;
 a processor coupled to the communication interface; and
 a memory coupled to the processor and having a computable readable program code embodied therein capable of causing the processor to initialize and personalize a smart card for usage in creating a unique secret key for an enrolled smart card using a card issuer private key, and generating signatures on an entered PIN using the unique key, the signatures being verifiable by the smart card and/or the terminal.

26. The apparatus according to claim 25 wherein the memory further comprises:
 a computable readable program code capable of causing the processor to compute a secret key u that is unique to the smart card using an equation of the form:

$u=I^d(\mod N)$, where I is an entity-identifier, d is a private exponent in an RSA system known only to the enrollment system, and N is an RSA system modulus;

a computable readable program code capable of causing the processor to compute a signature precursor A using an equation of the form:

$A=\text{PIN}^{-1}\cdot u(\mod N)$, where PIN is an enrollment Personal Identification Number (PIN);

transmitting to a smart card for computation and storage the signature precursor A, a public exponent e, the modulus N, and the entity-identifier I, the smart card being capable of computing a digital signature component t using an equation of the form:

$t=\text{PIN}^e(\mod N)$;

hashing at the smart card a function $Z=h(t, \text{PIN}, I)$ to compute a reference signature of the form:

$S=u\cdot\text{PIN}^Z(\mod N)$, where h( ) is a hashing algorithm, storing the reference signature S; and erasing the enrollment PIN, the secret key u, the digital signature component t, and function Z.

27. The apparatus according to claim 26 wherein the memory further comprises:
 a computable readable program code capable of causing the processor to compute a secret key u that is unique to the smart card using an equation of the form:

$u=I^d(\mod N)$, where I is an entity-identifier, d is a private exponent in an RSA system known only to the enrollment system, and N is an RSA system modulus;

transferring to the smart card the secret key u, the identity-identifier I, a public exponent e, and the modulus N, and an entity-selected Personal Identification Number (PIN), the smart card being capable of computing at the smart card a signature precursor A using an equation of the form:

$A=\text{PIN}^{-1}\cdot u(\mod N)$; and storing the signature precursor A, a public exponent e, the modulus N, and the entity-identifier I.

28. A data security apparatus comprising:
an off-line terminal capable of usage for off-line Personal Identification Number (PIN) verification using a smart card, the off-line terminal comprising:
 a communication interface capable of accepting and communicating with a smart card that executes off-line Personal Identification Number (PIN) verification;
 a processor coupled to the communication interface; and a memory coupled to the processor and having a computable readable program code embodied therein capable of causing the processor to interact with the smart card to verify an entity-entered PIN using a signature generated on a reference PIN, the signature being generated based on a unique secret key of an enrolled smart card derived from a card issuer private key.

29. The apparatus according to claim 28 wherein the memory further comprises:
   a computable readable program code capable of causing the processor to communicate with the smart card;
   a computable readable program code capable of causing the processor to receive a transaction PIN'; and
   a computable readable program code capable of causing the processor to operate in conjunction with the smart card to generate a candidate signature on the transaction PIN' using the unique key, and verify the candidate signature against a reference signature.

30. The apparatus according to claim 28 wherein the memory further comprises:
   a computable readable program code capable of causing the processor to communicate with the smart card;
   a computable readable program code capable of causing the processor to receive a transaction PIN';
   a computable readable program code capable of causing the processor to generate a random number;
   a computable readable program code capable of causing the processor to communicate the transaction PIN', and the random number to the smart card; and
   a computable readable program code capable of causing the processor to operate in conjunction with the smart card to generate a signature based on the transaction PIN' the at least one signature precursor, and the random number; and verify the signature.

31. The apparatus according to claim 28 wherein the memory further comprises:
   a computable readable program code capable of causing the processor to communicate with the smart card;
   a computable readable program code capable of causing the processor to receive a transaction PIN'; and
   a computable readable program code capable of causing the processor to operate in conjunction with the smart card to compute a transaction secret key u', a transaction digital signature component t', a transaction function Z', and a candidate signature S'using respective equations of the form:

$u'=\text{PIN}' \cdot A (\bmod N)$, $t'=(\text{PIN}')^e (\bmod N)$, $Z'=h(t', \text{PIN}', I)$; and $S'=u' \cdot (\text{PIN}')^{Z'} (\bmod N)$ and verify whether S'=S so that PIN'=PIN, verifying PIN'.

32. The apparatus according to claim 28 wherein the memory further comprises:
   a computable readable program code capable of causing the processor to communicate with the smart card;
   a computable readable program code capable of causing the processor to receive a transaction PIN';
   a computable readable program code capable of causing the processor to transfer to the smart card a random number $r_t$ generated at the transaction terminal, and the transaction PIN';
   a computable readable program code capable of causing the processor to wait at the transaction terminal for a response;
   a computable readable program code capable of causing the processor to operate in conjunction with the smart card to generate a random number $r_c$; and
   a computable readable program code capable of causing the processor to operate in conjunction with the smart card to compute a transaction digital signature component t, a transaction secret key u', a hash function Z, and signatures S and C, using respective equations of the form:

$t=(r_{t1} \cdot r_c \text{PIN}')^e (\bmod N)$, $u'=\text{PIN}' \cdot A (\bmod N)$, $Z=h(t, \text{PIN}', I)$, $S=u' \cdot (r_t \cdot r_c \text{PIN}')^Z (\bmod N)$, $C=I \cdot t^e (\bmod N)$, where h( ) is a hashing algorithm, and determining at the transaction terminal whether $S^e=C(\bmod N)$, and if so, verifying the signature S, affirming that PIN' is equal to PIN.

33. The apparatus according to claim 28 wherein:
   the card issuer private key is an RSA (Rivest, Shamir, and Adelman Public Key Cryptosystem) key.

34. A transaction system comprising:
   a network;
   a plurality of servers and/or hosts mutually coupled to the network;
   a plurality of terminals capable of communicative coupling to the servers via the network and capable of off-line PIN verification;
   a plurality of smart cards capable of enrollment in the transaction system and capable of insertion into the terminals for performing transactions; and
   a plurality of processors distributed among the smart cards, the servers, and/or the terminals, at least one of the processors being capable of performing a method for off-line Personal Identification Number (PIN) verification comprising:
      creating a unique secret key for an enrolled smart card using a card issuer private key;
      generating signatures on an entered PIN using the unique key, the signatures being verifiable by the smart card and/or the terminal;
      entering an initialization PIN to the smart card at an enrollment system;
      generating a reference signature on the initialization PIN using the unique key and the initialization PIN;
      storing the reference signature on the smart card: and
      discarding the PIN after signature generation.

35. A transaction system comprising:
   means for verifying a Personal Identification Number (PIN) using a smart card accessed on an off line terminal;
   means for creating a unique secret key for an enrolled smart card using a card issuer private key;
   means for generating signatures on an entered PIN using the unique key, the signatures being verifiable by the smart card and/or the terminal;

means for entering an initialization PIN to the smart card at an enrollment system;

means for generating a reference signature on the initialization PIN using the unique key and the initialization PIN;

means for storing the reference signature on the smart card; and means for discarding the PIN after signature generation.

36. A transaction system comprising:

a network;

a plurality of servers and/or hosts mutually coupled to the network;

a plurality of terminals capable of communicative coupling to the servers via the network and capable of off-line PIN verification;

a plurality of smart cards capable of enrollment in the transaction system and capable of insertion into the terminals for performing transactions; and a plurality of processors distributed among the smart cards, the servers, and/or the terminals, at least one of the processors being capable of performing a method for off-line Personal Identification Number (PIN) verification comprising:

creating a unique secret key for an enrolled smart card using a card issuer private key;

generating signatures on an entered PIN using the unique key, the signatures being verifiable by the smart card and/or the terminal;

entering an initialization PIN to the smart card at an enrollment system;

generating the unique secret key based on the private key;

generating at least one signature precursor from the unique secret key;

storing the at least one signature precursor on the smart card; and discarding the PIN and the unique secret key.

* * * * *

UNITED STATES PATENT AND TRADEMARK OFFICE
CERTIFICATE OF CORRECTION

PATENT NO. : 7,083,089 B2
APPLICATION NO. : 10/761752
DATED : August 1, 2006
INVENTOR(S) : W. Dale Hopkins It is certified that error appears in the above-identified patent and that said Letters Patent is hereby corrected as shown below:

In column 10, line 41, in Claim 5, delete "off line" and insert -- off-line --, therefor.

In column 11, line 3, in Claim 6, delete "$A=PIN'\cdot u(mod\ N)$," and insert -- $A=PIN^{-1}\cdot u(mod\ N)$, --, therefor.

In column 11, line 12, in Claim 6, after "$t=PIN^e(mod\ N)$" insert -- ; --.

In column 11, line 29, in Claim 7, delete "t" and insert -- t', --, therefor.

In column 11, line 36, in Claim 7, delete "$Z'=h(t'PIN',\ I)$" and insert -- $Z'=h(t',\ PIN',\ I)$ --, therefor.

In column 11, line 40, in Claim 7, delete "$S'=u'\cdot(PIN'^{Z'}(mod\ N)$" and insert -- $S'=u'\cdot(PIN')^{Z'}(mod\ N)$ --, therefor.

In column 12, line 29, in Claim 11, delete "$t=(r_t \cdot r_c \cdot PIN')^c(mod\ N)$" and insert -- $t=(r_t \cdot r_c \cdot PIN')^e(mod\ N)$ --, therefor.

In column 12, line 34, in Claim 11, delete "$S=u'\cdot(r_t-r_c\cdot PIN')^Z(mod\ N)$" and insert -- $S=u'\cdot(r_t \cdot r_c \cdot PIN')^Z(mod\ N)$ --, therefor.

In column 14, line 4, in Claim 20, after "$u=I^d(mod\ N)$" insert -- , --.

In column 14, line 21, in Claim 20, delete "$t=(PIN)^c(mod\ N)$" and insert -- $t=PIN^e(mod\ N)$ --, therefor.

In column 14, line 49, in Claim 21, delete "$t=(PIN')^c(mod\ N)$" and insert -- $t'=(PIN')^e(mod\ N)$ --, therefor.

In column 15, line 30, in Claim 23, after "Z" insert -- , --.

In column 17, line 34, in Claim 30, after "PIN'" insert -- , --.

In column 17, line 47, in Claim 31, delete "S'using" and insert -- S' using --, therefor.

In column 17, line 55, in Claim 31, after "$S'=u'\cdot(PIN')^{Z'}(mod\ N)$" insert -- , --.

UNITED STATES PATENT AND TRADEMARK OFFICE
CERTIFICATE OF CORRECTION

PATENT NO. : 7,083,089 B2
APPLICATION NO. : 10/761752
DATED : August 1, 2006
INVENTOR(S) : W. Dale Hopkins It is certified that error appears in the above-identified patent and that said Letters Patent is hereby corrected as shown below:

In column 18, line 14, in Claim 32, delete "$t=(r_{t1} \cdot r_c PIN')^e (mod\ N)$" and insert -- $t=(r_t \cdot r_c \cdot PIN')^e (mod\ N)$ --, therefor.

In column 18, line 19, in Claim 32, delete "$S=u' \cdot (r_t \cdot r_c PIN')^Z (mod\ N),$" and insert -- $S=u' \cdot (r_t \cdot r_c \cdot PIN')^Z (mod\ N),$ --, therefor.

In column 18, line 61, in Claim 35, delete "off line" and insert -- off-line --, therefor.

Signed and Sealed this

Eleventh Day of August, 2009

David J. Kappos
*Director of the United States Patent and Trademark Office*